(12) United States Patent
Kominato (10) Patent No.: US 12,233,779 B2
(45) Date of Patent: Feb. 25, 2025

(54) VEHICLE APPROACH NOTIFICATION DEVICE

(71) Applicant: SUBARU CORPORATION, Tokyo (JP)

(72) Inventor: Yuki Kominato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 97 days.

(21) Appl. No.: 18/125,345

(22) Filed: Mar. 23, 2023

(65) Prior Publication Data

US 2023/0311755 A1   Oct. 5, 2023

(30) Foreign Application Priority Data

Apr. 1, 2022   (JP) .................................. 2022-061852

(51) Int. Cl.
*B60Q 5/00*   (2006.01)
(52) U.S. Cl.
CPC .................................... *B60Q 5/006* (2013.01)
(58) Field of Classification Search
None
See application file for complete search history.

(56) References Cited

U.S. PATENT DOCUMENTS

2018/0158335 A1* 6/2018 Gee .................... G10K 15/04

FOREIGN PATENT DOCUMENTS

JP   2012-171406 A   9/2012

* cited by examiner

*Primary Examiner* — Thomas S McCormack
(74) *Attorney, Agent, or Firm* — TROUTMAN PEPPER LOCKE LLP (57) ABSTRACT

A vehicle approach notification device to be applied to a vehicle includes a determination processor, a selection processor, and a sound emission controller. The determination processor is configured to perform a determination as to whether to change a currently set notification sound when it is determined that a surrounding vehicle is detected. The selection processor is configured to select a notification sound in place of the currently set notification sound from multiple notification sounds when the determination processor determines to change the currently set notification sound in the determination. The sound emission controller is configured to perform sound emission control of the notification sound selected by the selection processor.

5 Claims, 11 Drawing Sheets

|  | CONDITION OF VEHICLE SPEED | SELECTED NOTIFICATION SOUND |
|---|---|---|
| SECOND SPEED RANGE | 10 < VEHICLE SPEED ≦ 20 | SECOND NOTIFICATION SOUND |
| FIRST SPEED RANGE | 0 < VEHICLE SPEED ≦ 10 | FIRST NOTIFICATION SOUND |

VEHICLE APPROACH NOTIFICATION DEVICE

CROSS-REFERENCE TO RELATED APPLICATION

The present application claims priority from Japanese Patent Application No. 2022-061852 filed on Apr. 1, 2022, the entire contents of which are hereby incorporated by reference.

BACKGROUND

The disclosure relates to the technical field of a vehicle approach notification device that generates a notification sound for informing a notification subject such as a pedestrian that a vehicle is approaching.

A vehicle such as a hybrid electric vehicle (HEV), a plug-in HEV (P-HEV) or an electric vehicle (EV), that is powered by a motor is quiet when traveling. Such vehicles are equipped with a device for emitting a notification sound to inform a target such as a pedestrian that the vehicle is approaching.

The notification sound emitted by the device is preferably a sound easily heard by the target. For example, Japanese Unexamined Patent Application Publication (JP-A) No. 2012-171406 discloses a technique for alerting subjects in the vicinity of the vehicle to approach of the vehicle by differentiating the volume and frequency of the notification sound (information sound) emitted by the vehicle from that of surrounding sounds.

SUMMARY

An aspect of the disclosure provides a vehicle approach notification device to be applied to a vehicle. The vehicle approach notification device includes a determination processor, a selection processor, and a sound emission controller. The determination processor is configured to perform a determination as to whether to change a currently set notification sound when it is determined that a surrounding vehicle is detected. The selection processor is configured to select a notification sound in place of the currently set notification sound from multiple notification sounds when the determination processor determines to change the currently set notification sound in the determination. The sound emission controller is configured to perform sound emission control of the notification sound selected by the selection processor.

An aspect of the disclosure provides a vehicle approach notification device to be applied to a vehicle. The vehicle approach notification device includes circuitry. The circuitry is configured to perform a determination as to whether to change a currently set notification sound when it is determined that a surrounding vehicle is detected. The circuitry is configured to, upon determining to change the currently set notification sound in the determination, select a notification sound in place of the currently set notification sound from multiple notification sounds. The circuitry is configured to perform sound emission control of the notification sound selected.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

When multiple vehicles approach a user, one or more of the vehicles may not emit (sound) an appropriate notification sound, and the user may not accurately grasp the situation.

An embodiment of the disclosure has been made in view of the above circumstances, and it is desirable that the embodiment allows a user to accurately grasp a situation where multiple vehicles are approaching.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
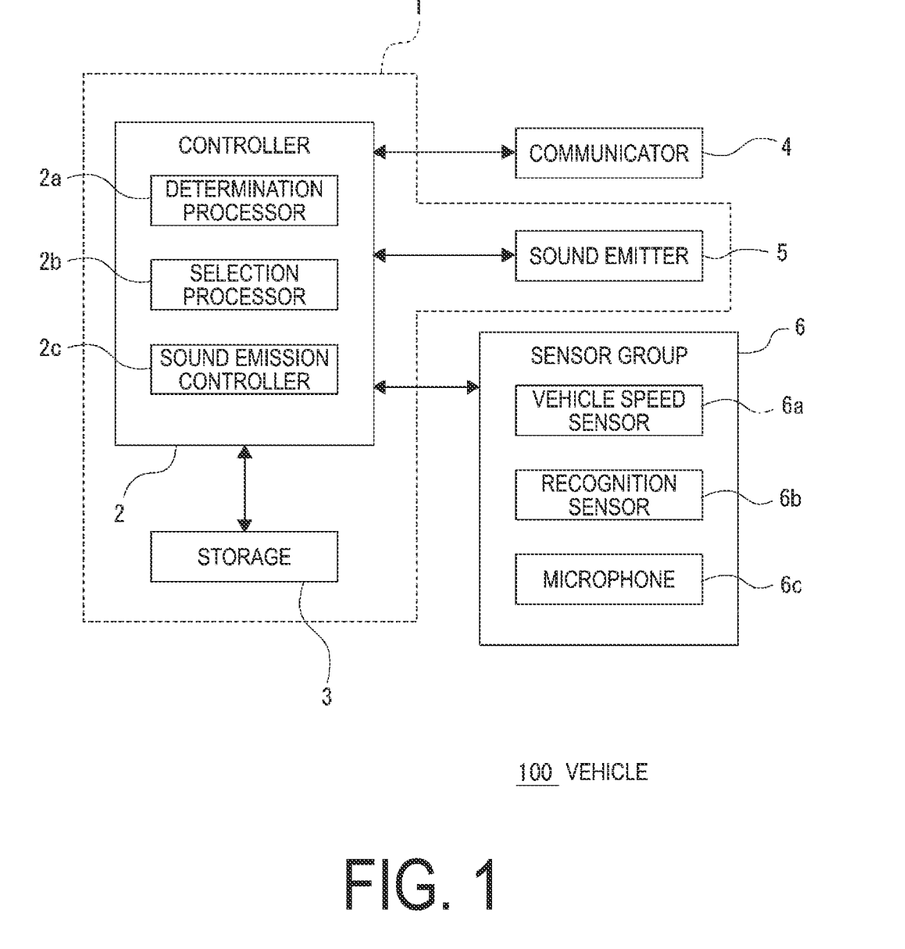
FIG. 1 is a schematic block diagram illustrating a configuration example of a vehicle according to an embodiment.

The configuration of a vehicle approach notification device 1 included in a vehicle 100 according to a first embodiment will be described with reference to FIG. 1.

The vehicle 100 can be applied to various vehicles including vehicles with an internal combustion engine, electric vehicles, and hybrid vehicles. In the present example, the vehicle 100 is a vehicle that is powered by a motor.

The vehicle 100 includes a controller 2, a storage 3, a communicator 4, a sound emitter 5, and a sensor group 6.

The controller 2, the storage 3, and the sound emitter 5 constitute the vehicle approach notification device 1.

The controller 2 includes a processor including a central processing unit (CPU) or the like and a storage medium including a read only memory (ROM), a random access memory (RAM), or the like. The controller 2 includes one or more electronic control units (ECUs), for example.

Each of the ECUs includes a processor and a storage medium. The controller 2 and the storage 3 illustrated in FIG. 1 comprehensively represent arithmetic processors and storage media included in the ECUs.

The controller 2 executes various kinds of processing for the vehicle 100. For example, in the present embodiment, the controller 2 performs various kinds of processing to generate a notification sound (information sound) for notifying (informing) a pedestrian or the like in the vicinity of the vehicle 100 of approach of the vehicle 100. For this purpose, in one embodiment, the controller 2 serves as a determination processor 2a, a selection processor 2b, and a sound emission controller 2c. Each of these units will be described later.

Here, the vehicle 100 may be referred to as "host vehicle 100A". A vehicle other than the host vehicle 100A may be referred to as "another vehicle". A subject (user) such as a pedestrian or a cyclist present in the vicinity of the host vehicle 100A and alerted by the notification sound may be referred to as a "notification subject".

As described above, the vehicle 100 is a vehicle that is powered by a motor. Thus, a certain amount of noise is generated during high-speed traveling, and this noise alerts the pedestrian or the like to the presence of the vehicle 100 without visual recognition. However, less noise is generated during low-speed traveling, and the pedestrian or the like is less likely to be aware of the presence of the vehicle 100.

Thus, when the speed of the vehicle 100 is a predetermined speed or lower, the controller 2 of the vehicle 100 emits a notification sound for altering subjects in the vicinity of the vehicle to the presence of the host vehicle 100A. The predetermined speed is, for example, 20 km/h.

The storage 3 stores a program, data, and the like used for processing of the controller 2. For example, in the present embodiment, information of the notification sound to be emitted and the like are stored in the storage 3.

The communicator 4 can perform various types of communication such as vehicle-to-vehicle communication and road-to-vehicle communication. For example, in the present embodiment, the communicator 4 acquires information for determining the notification sound to be emitted by vehicle-to-vehicle communication. A manufacturing number, vehicle type information, or a manufacturing date can be acquired by vehicle-to-vehicle communication as appropriate, with details to be described later.

The sound emitter 5 includes a speaker or the like, and emits the notification sound determined by the controller 2.

The sensor group 6 comprehensively represents various sensors included in the vehicle 100. In the present embodiment, the vehicle 100 includes a vehicle speed sensor 6a, a recognition sensor 6b, and a microphone 6c.

The vehicle speed sensor 6a is a sensor that detects a traveling speed of the vehicle 100. For example, the vehicle speed sensor 6a can be implemented by a sensor that detects wheel speed.

The recognition sensor 6b is a sensor that detects an object located outside the vehicle 100. The recognition sensor 6b can be implemented by, for example, an image sensor, an ultrasonic sensor, a millimeter wave radar, or a light detection and ranging (LiDAR).

The recognition sensor 6b can acquire a sensing result or the like as to whether another vehicle is present in the vicinity of the vehicle 100.

The microphone 6c is a sensor that collects sound outside the vehicle 100. The collected acoustic signal is subjected to predetermined signal processing and then output to the controller 2.

The determination processor 2a of the controller 2 performs various kinds of determination processing. For example, the determination processor 2a determines whether to emit the notification sound. The determination processor 2a also determines whether to change the notification sound. Note that the determination processor 2a also performs other determination processing, which will be described in detail later.

The selection processor 2b performs processing of selecting the notification sound. The notification sound is selected based on the determination result of the determination processor 2a.

The sound emission controller 2c performs various sound emission control by outputting a start command for starting the sound emission, a stop command for stopping the sound emission, a command for changing the notification sound, or the like, to the sound emitter 5.

Processing performed by each unit of the controller 2 will be described. First, a flow of the processing performed by the controller 2 for emitting the notification sound will be described with reference to FIG. 2.

Figure 2:
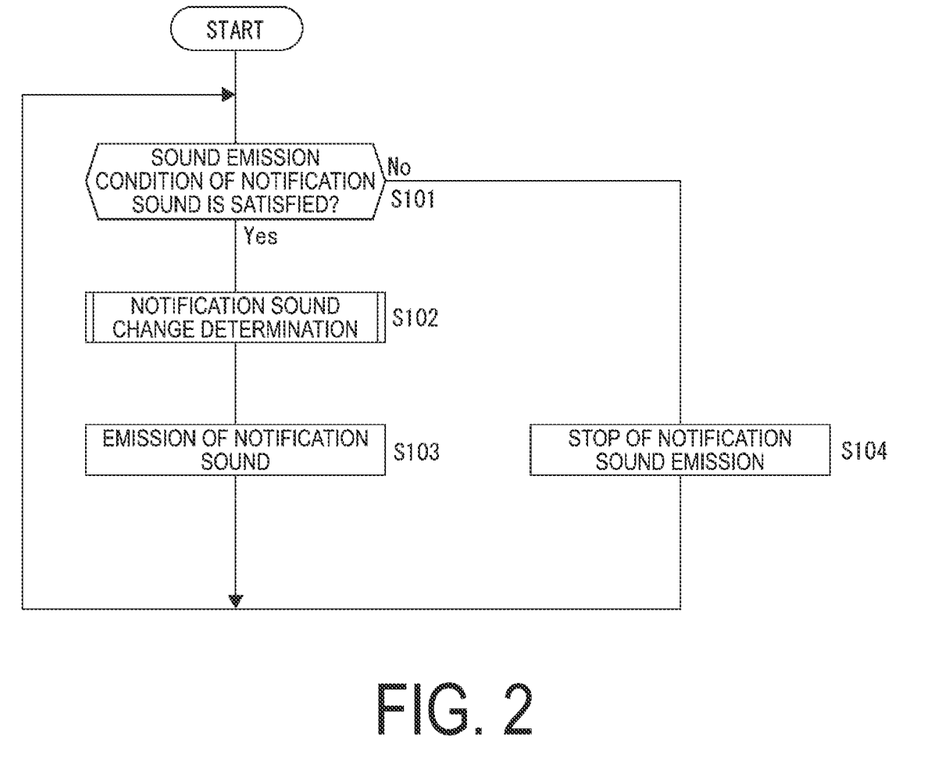
FIG. 2 is a flowchart illustrating an example of processing performed to emit a notification sound.

In step S101 in FIG. 2, the determination processor 2a of the controller 2 determines whether a sound emission condition of the notification sound is satisfied.

For example, as described above, the sound emission condition of the notification sound is determined based on whether the host vehicle 100A is traveling at 20 km/h or less.

When it is determined that the host vehicle 100A is traveling at 20 km/h or less, the controller 2 performs a notification sound change determination. This determination processing determines whether to change the currently set notification sound, and changes the notification sound in accordance with the determination result as appropriate.

A case where the notification sound is to be changed is, for example, when the notification sound of the host vehicle 100A is the same as or similar to the notification sound of another vehicle.

After completing the notification sound change determination, in step S103, the sound emission controller 2c of the controller 2 emits the notification sound. Then, the processing returns to step S101.

On the other hand, in step S101, when it is determined that the sound emission condition is not satisfied, for example, when the vehicle is stopped or when it is determined that the speed of the host vehicle 100A is higher than 20 km/h, in step S104, the sound emission controller 2c of the controller 2 performs processing of stopping emission of the notification sound. Note that, if the emission of the notification sound is already in a stop state, this stop state is continued.

By the controller 2 performing the series of processing illustrated in FIG. 2, the notification sound is emitted or stopped at an appropriate timing according to the speed of the host vehicle 100A.

Figure 3:
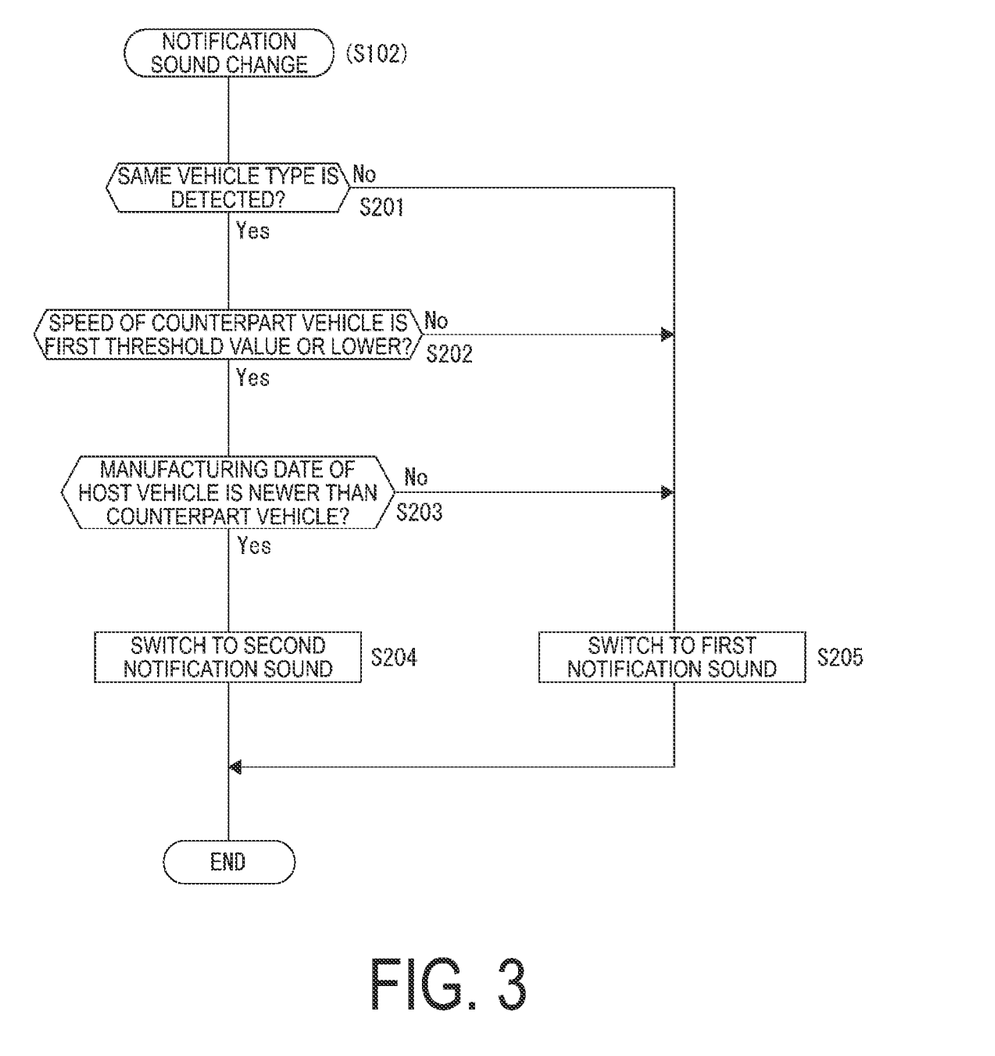
FIG. 3 is a flowchart illustrating an example of notification sound change determination processing.

Next, an example of the notification sound change determination processing in step S102 will be described.

In the notification sound change determination processing, first, in step S201, the determination processor 2a of the controller 2 determines whether another vehicle of the same vehicle type is detected in the vicinity of the host vehicle 100A.

When another vehicle of the same vehicle type is detected, it is desirable that either vehicle changes its notification sound because the notification sound may be the same.

The host vehicle 100A acquires vehicle type information from the other vehicle by vehicle-to-vehicle communication. Based on the vehicle type information, the host vehicle 100A can determine whether the other vehicle is of the same vehicle type as the host vehicle 100A.

Here, the other vehicle of the same vehicle type is referred to as a "counterpart vehicle 100B".

When it is determined that the counterpart vehicle 100B is detected, in step S202, the determination processor 2a of the controller 2 determines whether the vehicle speed of the counterpart vehicle 100B is a first threshold value or lower.

Here, the first threshold value is the above-described predetermined speed and is, for example, 20 km/h.

That is, the processing in step S202 is processing of determining whether the counterpart vehicle 100B is in a state of emitting the notification sound.

The vehicle speed information of the counterpart vehicle 100B may be acquired by vehicle-to-vehicle communication, or may be estimated based on sensing information detected by various sensors such as an image sensor.

When it is determined that the vehicle speed of the counterpart vehicle 100B is the first threshold value or lower, in step S203, the determination processor 2a of the controller 2 determines whether the manufacturing date of the host vehicle 100A is newer than that of the counterpart vehicle 100B.

The processing in step S203 is determination processing of determining which of the notification sound of the host vehicle 100A and the notification sound of the counterpart vehicle 100B is to be changed. The determination processing may be any method that can uniquely identify either of the host vehicle 100A or the counterpart vehicle 100B. The determination processing may be based on the manufacturing date since only one of the host vehicle 100A and the counterpart vehicle 100B corresponds to a vehicle 100 whose manufacturing date is newer.

The information of the manufacturing date can be acquired by vehicle-to-vehicle communication, for example. If the manufacturing dates are the same, the notification sound of the vehicle 100 whose manufacturing number is newer is changed.

When it is determined that the manufacturing date of the host vehicle 100A is newer, in step S204, the selection processor 2b of the controller 2 performs processing of selecting a second notification sound, that is, processing of switching to the second notification sound.

A first notification sound is the notification sound set for normal sound emission, and the second notification sound is a notification sound prepared as a backup. The second notification sound is switched to and used as appropriate depending on the situation.

After the processing in step S204, the controller 2 ends the series of processing illustrated in FIG. 3, and the processing returns to the processing in FIG. 2. Note that, as illustrated in FIG. 2, the notification sound change determination processing in FIG. 3 is performed many times at every predetermined time interval. Thus, the processing in step S204 may be performed again after switching to the second notification sound. In this case, the processing in step S204 is performed as processing of maintaining the state where the notification sound is switched to the second notification sound.

In step S201, when it is determined that the same vehicle type is not detected, there is no possibility that the notification sounds are the same. This is because the notification sound of the host vehicle 100A is set in advance to be different from the notification sounds emitted by vehicles of different types. Thus, in this case, in step S205, the selection processor 2b of the controller 2 performs processing of selecting the first notification sound. Note that, when the notification sound selected immediately before is the second notification sound, in step S205, processing of switching from the second notification sound to the first notification sound is performed.

In step S202, when it is determined that the speed of the counterpart vehicle 100B is higher than the first threshold value, it is estimated that the counterpart vehicle 100B is not emitting the notification sound. Thus, in step S205, the selection processor 2b of the controller 2 of the host vehicle 100A performs processing of selecting the first notification sound.

Further, in step S203, when it is determined that the manufacturing date of the counterpart vehicle 100B is newer than that of the host vehicle 100A, the counterpart vehicle 100B changes the notification sound to the backup notification sound (second notification sound). Thus, in step S205, the selection processor 2b of the controller 2 of the host vehicle 100A performs the processing of selecting the first notification sound.

By performing each type of processing illustrated in FIGS. 2 and 3, the vehicle approach notification device 1 of the vehicle 100 can emit a notification sound while avoiding the same notification sound as that of another vehicle.

In a second embodiment, different from the first embodiment, the notification sound is changed based on a result of comparison between speed ranges of the host vehicle 100A and the counterpart vehicle 100B.

Figure 4:
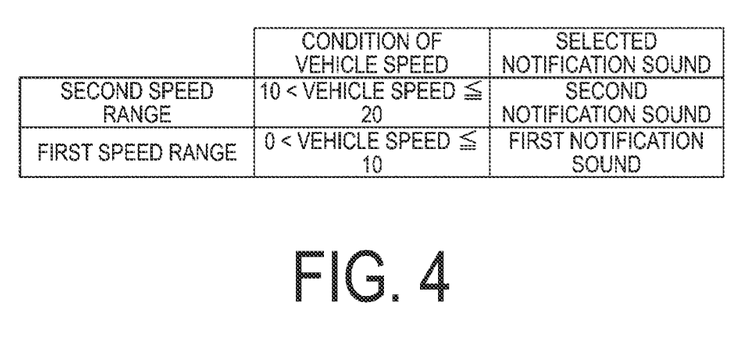
FIG. 4 is a diagram illustrating a relationship between speed ranges and notification sounds in an embodiment.

First, as illustrated in FIG. 4, in the vehicle approach notification device 1 of the vehicle 100, the notification sound is selected in accordance with the speed of the host vehicle 100A. That is, in the vehicle approach notification device 1, when the speed of the host vehicle 100A is higher than 0 km/h and 10 km/h or lower, the first notification sound is selected. When the speed of the host vehicle 100A is higher than 10 km/h and 20 km/h or lower, the second notification sound is selected.

Here, the second notification sound is louder than the first notification sound.

A speed range in which the vehicle speed is higher than 0 km/h and 10 km/h or lower is referred to as a "first speed range". A speed range that is designated as higher than 10 km/h and 20 km/h or lower is referred to as a "second speed range".

Figure 5:
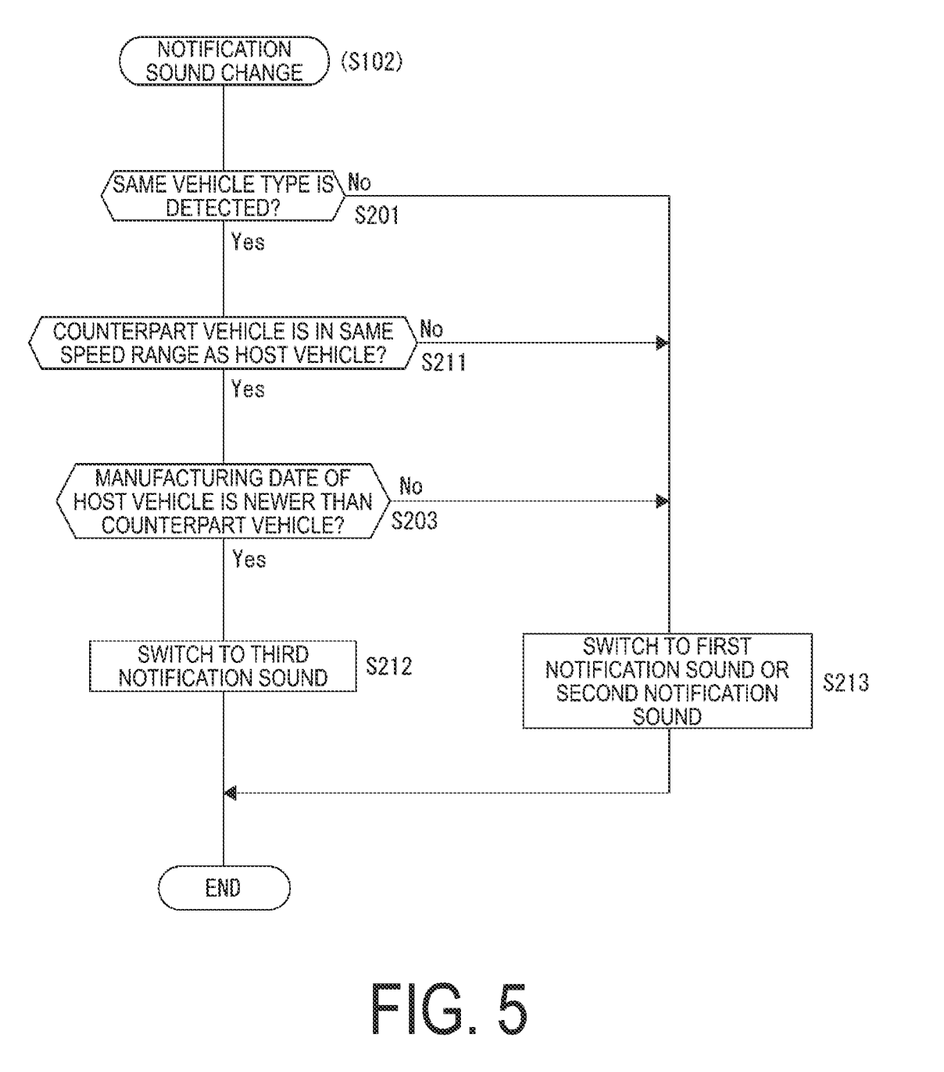
FIG. 5 is a flowchart illustrating an example of notification sound change determination processing according to the embodiment.

Based on this, the flow of the notification sound change determination processing illustrated in FIG. 5 will be described. Note that the same step numbers are given to the processing similar to those in FIG. 3, and description thereof is omitted as appropriate.

In step S201, the determination processor 2a of the controller 2 determines whether the determination processor 2a of the controller 2 detects another vehicle of the same vehicle type (counterpart vehicle 100B) in the vicinity of the host vehicle 100A.

When it is determined that the counterpart vehicle 100B is detected, in step S211, the determination processor 2a of the controller 2 determines whether the counterpart vehicle 100B is in the same speed range as the host vehicle 100A. The speed range referred to here is the first speed range or the second speed range illustrated in FIG. 4. A state in which the host vehicle 100A is traveling at 15 km/h and the counterpart vehicle 100B is traveling at 17 km/h is referred to as traveling in the same speed range.

When the host vehicle 100A and the counterpart vehicle 100B are traveling in the same speed range, the notification sounds are the same, and thus one of the notification sounds is to be changed.

In step S203, the determination processor 2a of the controller 2 determines whether the manufacturing date (or the manufacturing number) of the host vehicle 100A is newer than that of the counterpart vehicle 100B. When it is determined that the host vehicle 100A is newer, in step S212, the selection processor 2b of the controller 2 switches the notification sound to a third notification sound.

On the other hand, when a negative determination ("No" in FIG. 3) is made in any of steps S201, S211, and S203, in step S213, the selection processor 2b of the controller 2 switches the notification sound to the first notification sound or the second notification sound.

Whether to switch to the first notification sound or the second notification sound is determined in accordance with the speed of the host vehicle 100A (see FIG. 4).

In the first embodiment, a case is described in which the vehicle approach notification device 1 of the vehicle 100 can emit the first notification sound and the second notification sound, but the third notification sound may be also emitted as in the second embodiment.

For example, the first notification sound is emitted when the vehicle 100 is traveling in the first speed range, and the second notification sound is emitted when the vehicle 100 is traveling in the second speed range (see FIG. 4).

When the counterpart vehicle 100B of the same vehicle type is present near the host vehicle 100A and the counterpart vehicle 100B is emitting the notification sound, the notification sound may be switched to the third notification sound different from the first notification sound and the second notification sound for the vehicle 100 with the newer manufacturing number of either one of the host vehicle 100A or the counterpart vehicle 100B. That is, the processing in step S212 in FIG. 5 may be performed instead of the processing in step S204 in FIG. 3.

As a result, the controller 2 of the vehicle 100 can emit a notification sound different from the notification sound emitted from the other vehicle present in the vicinity of the vehicle 100 without determining which speed range the counterpart vehicle 100B is in.

In the third embodiment, unlike the first embodiment and the second embodiment, it is not determined whether the other vehicle is of the same vehicle type as the host vehicle 100A.

In one example, it is determined whether the notification sound emitted by the host vehicle 100A and the notification sound emitted by the other vehicle have similar characteristics. When it is determined that they have similar characteristics, one of the notification sounds is changed before being emitted.

In order to determine such a similarity, the storage 3 of the vehicle approach notification device 1 stores the characteristic (a frequency having a high sound pressure level and the sound pressure level thereof) of the notification sound emitted by the host vehicle 100A.

The determination processor 2a of the controller 2 compares result information obtained by analyzing a characteristic of an acoustic signal obtained from the microphone 6c with the stored characteristic of the notification sound to determine whether the notification sounds are similar to each other.

Several methods for determining whether the notification sounds are similar to each other can be used. For example, one of the methods can be determining whether the frequencies having high sound pressure levels are close to each other. When the difference between the frequencies having high sound pressure levels is smaller than a predetermined value, it is determined that the notification sounds are similar to each other. When there are multiple frequencies having high sound pressure levels, it may be determined that the notification sounds are similar to each other when the frequencies of both notification sounds are the same as or close to each other.

The notification sound may be changed by changing a part of an existing notification sound.

Some examples will be given.

Figure 6:
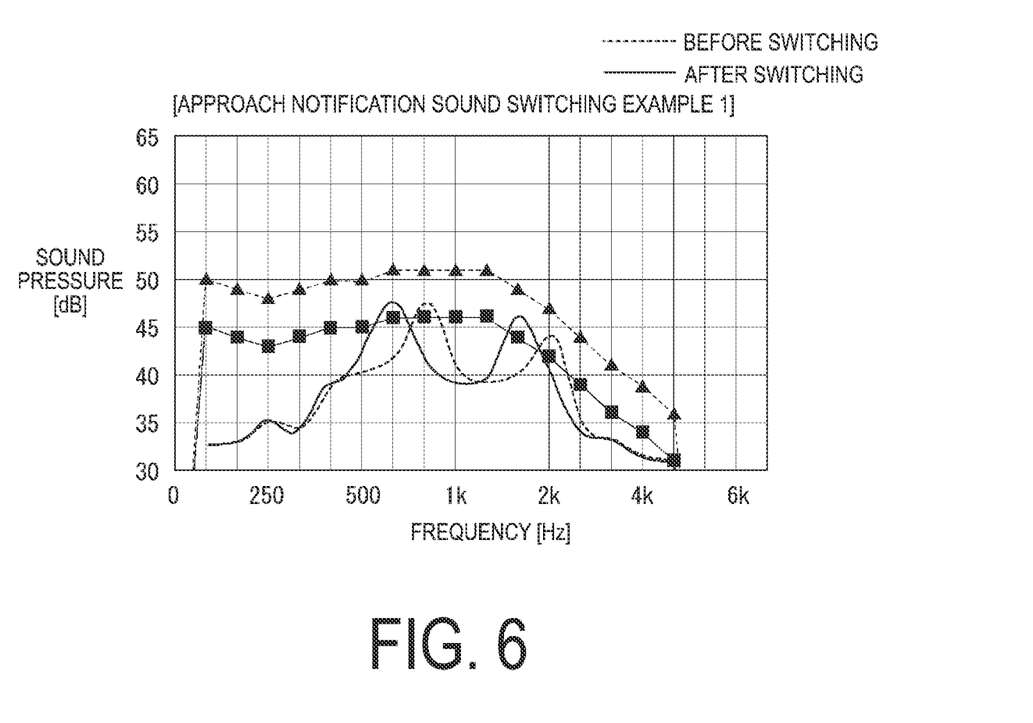
FIG. 6 is a graph illustrating a first example of a change mode of the notification sound.

A first example is illustrated in FIG. 6. In the graph in FIG. 6, a regulation value for each frequency in the first speed range is indicated by a square symbol, and a regulation value for each frequency in the second speed range is indicated by a triangle symbol.

Here, the regulation value is a sound pressure level that is to be exceeded at two frequencies. The frequency exceeding the regulation value may be adjusted, so that a different notification sound can be emitted.

The broken line (with no symbols) in FIG. 6 represents the sound pressure level with respect to the frequency of the first notification sound selected in the first speed range. The solid line (with no symbols) in FIG. 6 represents the sound pressure level with respect to the frequency of the third notification sound selected in the first speed range.

Note that the notification sound selected in the second speed range is not illustrated.

In the first example illustrated in FIG. 6, both of two peak frequencies are shifted to a low frequency side to generate a different notification sound (third notification sound). As a result, the third notification sound that is significantly different from the first notification sound can be generated.

In addition to this, the different third notification sound may be generated by shifting both of the two peak frequencies to a high frequency side, or by shifting the two peak frequencies in directions different from each other and away from each other.

Figure 7:
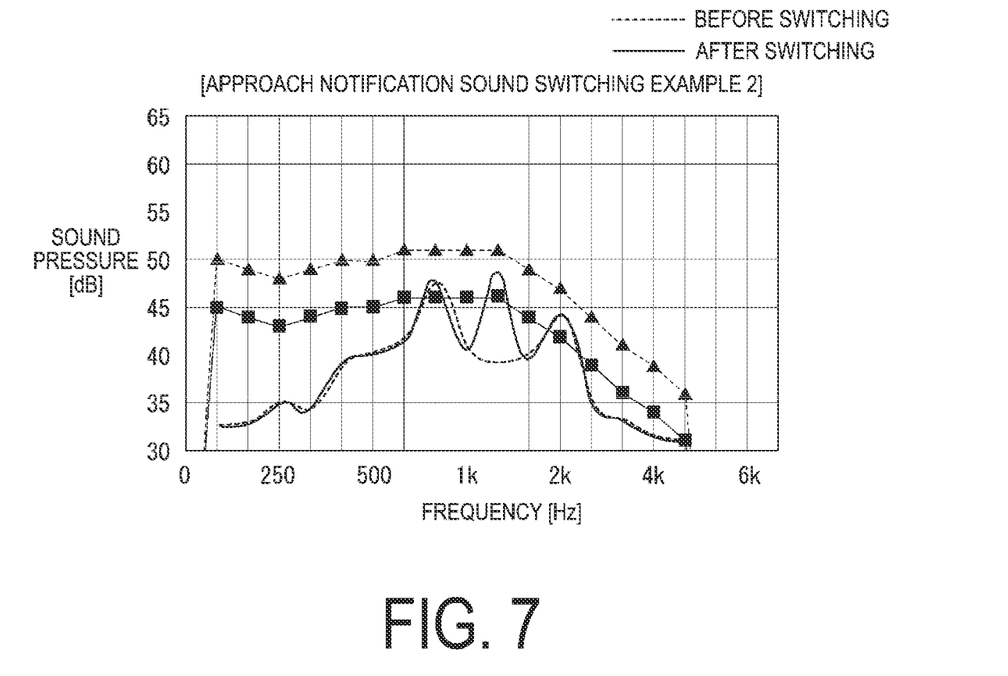
FIG. 7 is a graph illustrating a second example of the change mode of the notification sound.

In a second example illustrated in FIG. 7, a different notification sound is generated by forming a third peak frequency between two peak frequencies.

Figure 8:
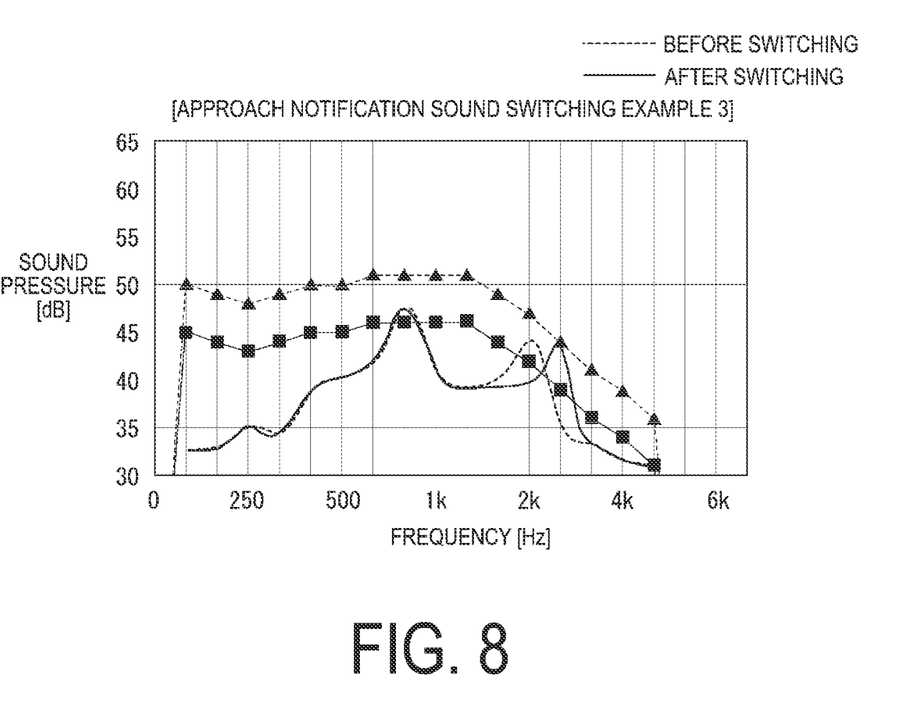
FIG. 8 is a graph illustrating a third example of the change mode of the notification sound.

In a third example illustrated in FIG. 8, a different notification sound is generated by shifting the peak on the high frequency side of the two peak frequencies to a further high frequency side.

Figure 9:
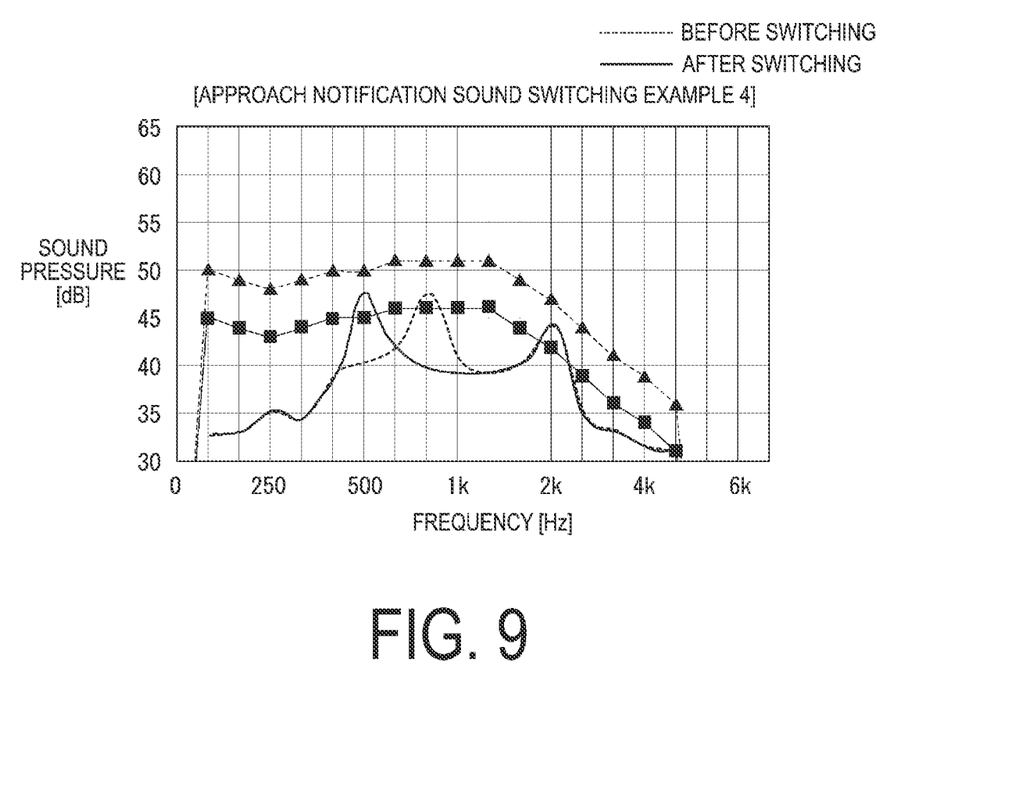
FIG. 9 is a graph illustrating a fourth example of the change mode of the notification sound.

In a fourth example illustrated in FIG. 9, a different notification sound is generated by shifting the peak on the low frequency side of the two peak frequencies to a further low frequency side.

Figure 10:
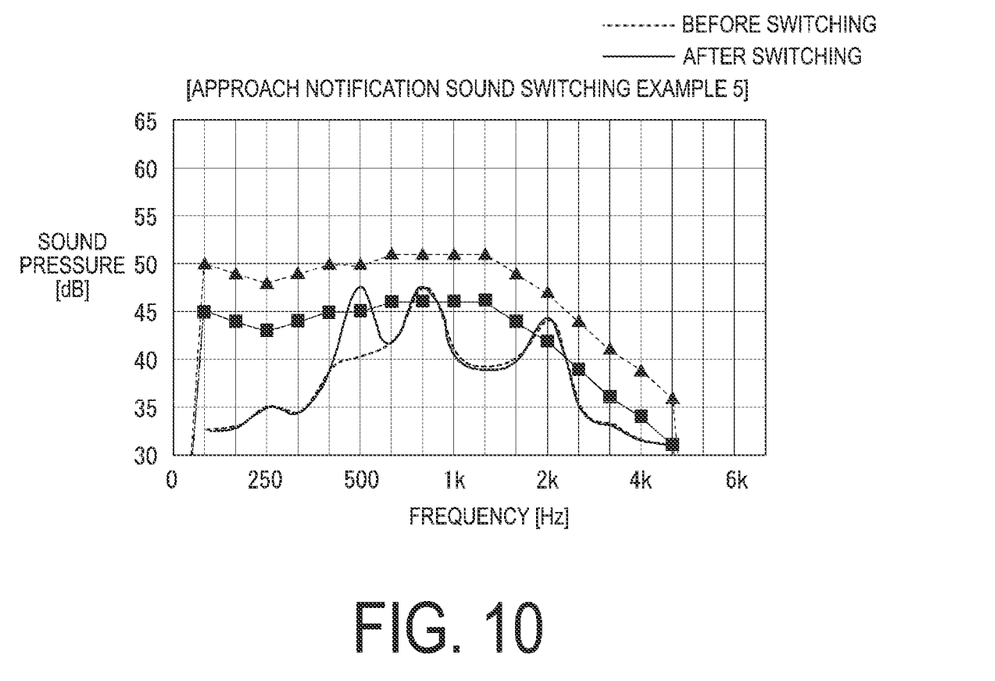
FIG. 10 is a graph illustrating a fifth example of the change mode of the notification sound.

In a fifth example illustrated in FIG. 10, a different notification sound is generated by forming a third peak frequency on a further low frequency side of the two peak frequencies.

Note that a mask range in a mask effect is narrower in the low frequency region than in the high frequency region. As illustrated in FIG. 10, when the third peak frequency is formed on the low frequency side, the mask effect may be less likely to occur. A sound on the low frequency side may also be easier for elderly pedestrians or the like to hear.

In any of the examples, the third notification sound is generated by changing a part of the first notification sound. Accordingly, a different notification sound can be easily generated.

Figure 11:
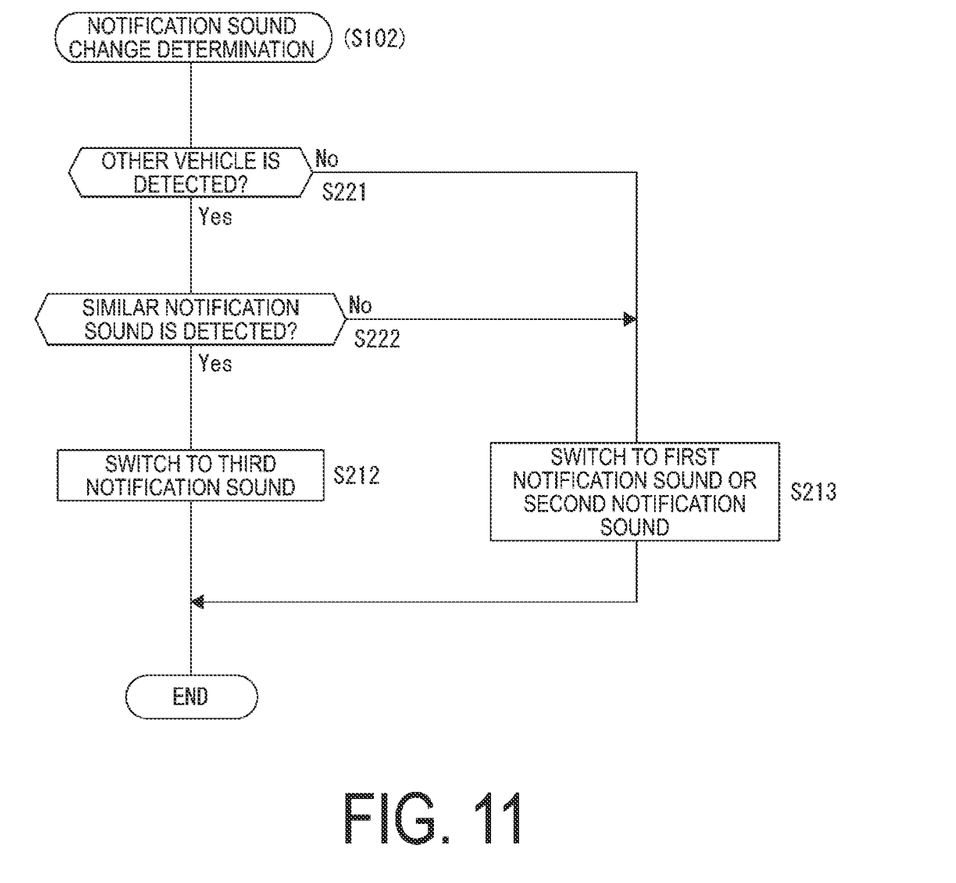
FIG. 11 is a flowchart illustrating an example of notification sound change determination processing according to an embodiment.

The flow of the notification sound change determination processing will be described with reference to FIG. 11. Note that the same step numbers are given to processing similar to those in FIGS. 3 and 5, and description thereof is omitted as appropriate.

In step S221, the determination processor 2a of the controller 2 determines whether another vehicle is detected. The other vehicle referred to here may or may not be of the same vehicle type as the host vehicle 100A.

Next, in step S222, the determination processor 2a of the controller 2 performs a determination as to whether a similar notification sound is detected. This determination is performed according to an output signal from the microphone 6c.

When it is determined that a similar notification sound is detected, in step S212, the selection processor 2b of the controller 2 switches the notification sound to the third notification sound.

On the other hand, when a negative determination ("No" in FIG. 11) is made in any of steps S221 and S222, in step S213, the selection processor 2b of the controller 2 switches the notification sound to the first notification sound or the second notification sound.

Whether to switch to the first notification sound or the second notification sound is determined in accordance with the speed of the host vehicle 100A (see FIG. 4). As a result, the processing returns to the state of emitting the original notification sound.

In the above-described examples, the notification sound of the vehicle 100 with a newer manufacturing date (or manufacturing number) is changed. However, the notification sound of the vehicle 100 with an older manufacturing date (or manufacturing number) may be changed.

Alternatively, the vehicle 100 to be changed may be determined by vehicle-to-vehicle communication.

The timing of switching the notification sound may be determined according to an output image from a camera that captures an image of the outside of the vehicle 100. In this case, the timing of the switching may be determined in accordance with the traveling direction of another vehicle and/or the distance from the other vehicle to the host vehicle 100A.

In one example, the timing of switching the notification sound or whether to switch the notification sound may be determined when another vehicle is approaching the host vehicle 100A from the front, when another vehicle is following the host vehicle 100A from the rear, or when another vehicle is traveling in front of the host vehicle 100A in the same direction.

For example, in a situation where another vehicle is approaching the host vehicle 100A from the front, when the relative speed is high, the notification sound is switched early so that a pedestrian or the like is alerted to the presence of the vehicles early, thereby contributing to improvement of safety.

When another vehicle is traveling in the same direction as the host vehicle 100A, the notification sound is switched early so that a pedestrian or the like is alerted to the presence of the vehicle early, thereby contributing to improvement of safety.

As described above, a vehicle approach notification device 1 includes a determination processor 2a, a selection processor 2b, and a sound emission controller 2c. The determination processor 2a is configured to perform a determination as to whether to change a currently set notification sound when it is determined that a surrounding vehicle (another vehicle such as the counterpart vehicle 100B) is detected. The selection processor 2b is configured to select a notification sound in place of the currently set notification sound from multiple notification sounds when the determination processor 2a determines to change the currently set notification sound in the determination. The sound emission controller 2c is configured to perform sound emission control of the notification sound selected by the selection processor 2b.

As a result, a situation where a surrounding vehicle is present and may emit a similar notification sound can be appropriately determined.

Thus, in a situation where multiple vehicles are approaching a pedestrian or the like serving as the notification subject, or in a situation where multiple vehicles are approaching the notification subject from the same direction one after another, the notification subject can be readily alerted to the presence of the multiple vehicles, thereby contributing to improvement of safety.

The determination processor 2a of the vehicle approach notification device 1 may determine whether to change the currently set notification sound when the detected surrounding vehicle (another vehicle such as the counterpart vehicle 100B) is of the same vehicle type as the host vehicle 100A.

As a result, in a situation where the other vehicle (counterpart vehicle 100B) is of exactly the same vehicle type as the host vehicle 100A and may emit exactly the same notification sound, the other vehicle and the host vehicle 100A can be made to emit different notification sounds, thereby improving safety.

The determination processor 2a of the vehicle approach notification device 1 may determine to change the currently set notification sound when it is determined that the notification sound emitted from the detected surrounding vehicle (another vehicle such as the counterpart vehicle 100B) is similar to the currently set notification sound.

As a result, in a situation where similar notification sounds are emitted despite the other vehicle and the host vehicle 100A being different vehicle types, the other vehicle and the host vehicle 100A can be made to emit different notification sounds, thereby improving safety.

The determination processor 2a of the vehicle approach notification device 1 may determine whether to change the currently set notification sound when it is detected that the detected surrounding vehicle (another vehicle such as the counterpart vehicle 100B) and the host vehicle 100A approach the notification subject from the same direction.

When the host vehicle 100A and the other vehicle are traveling in the same direction, both vehicles are likely to approach the notification subject from the same direction. In this case, the notification subject is likely to misjudge the number of approaching vehicles as one. In such a situation, the other vehicle and the host vehicle 100A can emit different notification sounds so that the notification subject can easily recognize that the number of approaching vehicles is two, thereby contributing to an improvement in safety.

In determining whether to change the currently set notification sound, the determination processor 2a of the vehicle approach notification device 1 may determine to change the currently set notification sound when the manufacturing number of the host vehicle 100A is newer than that of the detected surrounding vehicle (another vehicle such as the counterpart vehicle 100B).

In a situation where both the surrounding vehicle and the host vehicle 100A are to emit notification sounds, which of the vehicles is to change the notification sound is important when similar notification sounds are emitted from both vehicles. For example, if both vehicles change their notification sound, the notification sounds after the change may still be similar to each other, and the notification subject may continue to misjudge the situation.

With the configuration described above, the vehicle that is to change the notification sound can be clearly and easily specified. Accordingly, the notification sound can be changed without significantly increasing processing load.

According to an embodiment of the disclosure, it is possible to accurately alert a user such as a pedestrian to a situation where multiple vehicles are approaching.

The invention claimed is:

1. A vehicle approach notification device to be applied to a vehicle, the vehicle approach notification device comprising:
   a determination processor configured to perform a determination as to whether to change a currently set notification sound when it is determined that a surrounding vehicle is detected;
   a selection processor configured to select a notification sound in place of the currently set notification sound from multiple notification sounds when the determination processor determines to change the currently set notification sound in the determination; and
   a sound emission controller configured to perform sound emission control of the notification sound selected by the selection processor, wherein
   the determination processor is configured to perform the determination as to whether to change the currently set notification sound when the surrounding vehicle detected is of a same vehicle type as the vehicle, and
   in the determination as to whether to change the currently set notification sound, the determination processor is configured to determine to change the currently set notification sound when a manufacturing number of the vehicle is newer than a manufacturing number of the surrounding vehicle.

2. The vehicle approach notification device according to claim 1, wherein
   the determination processor is configured to determine to change the currently set notification sound when the determination processor determines that a notification sound emitted from the surrounding vehicle detected is similar to the currently set notification sound.

3. The vehicle approach notification device according to claim 1, wherein
   the determination processor is configured to perform the determination as to whether to change the currently set notification sound when the surrounding vehicle and the vehicle are traveling in a same direction.

4. The vehicle approach notification device according to claim 2, wherein
   the determination processor is configured to perform the determination as to whether to change the currently set notification sound when the surrounding vehicle and the vehicle are traveling in a same direction.

5. A vehicle approach notification device to be applied to a vehicle, the vehicle approach notification device comprising circuitry configured to
   perform a determination as to whether to change a currently set notification sound when it is determined that a surrounding vehicle is detected,
   upon determining to change the currently set notification sound in the determination, select a notification sound in place of the currently set notification sound from multiple notification sounds, and
   perform sound emission control of the notification sound selected, wherein
   the determination is performed as to whether to change the currently set notification sound when the surrounding vehicle detected is of a same vehicle type as the vehicle, and
   in the determination as to whether to change the currently set notification sound, the currently set notification sound is determined to be changed when a manufacturing number of the vehicle is newer than a manufacturing number of the surrounding vehicle.

* * * * *